United States Patent
Lundahl

(10) Patent No.: US 10,719,804 B1
(45) Date of Patent: Jul. 21, 2020

(54) SMARTPHONE-CONTROLLED MAILBOX SYSTEM

(71) Applicant: Advanced Technology & Research Corp., Columbia, MD (US)

(72) Inventor: Robert Lundahl, Frederick, MD (US)

(73) Assignee: Advanced Technology & Research Corp., Columbia, MD (US)

( * ) Notice: Subject to any disclaimer, the term of this patent is extended or adjusted under 35 U.S.C. 154(b) by 801 days.

(21) Appl. No.: 14/612,246

(22) Filed: Feb. 2, 2015

Related U.S. Application Data

(60) Provisional application No. 61/934,189, filed on Jan. 31, 2014.

(51) Int. Cl.
G06Q 10/08 (2012.01)
H04W 12/06 (2009.01)
H04W 4/70 (2018.01)

(52) U.S. Cl.
CPC .......... G06Q 10/0836 (2013.01); H04W 4/70 (2018.02); H04W 12/06 (2013.01)

(58) Field of Classification Search
CPC ... G06Q 10/083; G06Q 10/0836; H04W 4/70; H04W 12/06
USPC ....................................................... 705/339
See application file for complete search history.

(56) References Cited

U.S. PATENT DOCUMENTS

| | | | | |
|---|---|---|---|---|
| 6,105,014 A * | 8/2000 | Ramsden | ............. | G01G 19/005 705/400 |
| 2004/0093314 A1 * | 5/2004 | MacKlin | ................ | G06Q 10/08 705/406 |
| 2007/0192191 A1 * | 8/2007 | Neal | ...................... | G06Q 10/08 705/14.26 |
| 2010/0223127 A1 * | 9/2010 | Bettez | .................... | G06Q 10/08 705/14.51 |

(Continued)

OTHER PUBLICATIONS

Weir, James. NZ Post eyes potential of self-service kiosks. Aug. 27, 2011. Fairfax Media. Dominion Post Retrieved from http://dialog.proquest.com/professional/docview/887072982?accountid=161862. (Year: 2011).*

(Continued)

*Primary Examiner* — George Chen
*Assistant Examiner* — Hunter A Molnar
(74) *Attorney, Agent, or Firm* — Fresh IP PLC; Clifford D. Hyra; Aubrey Chen

(57) ABSTRACT

A mailbox system includes a remote computing device and a mailbox. The remote computing device is configured to communicate with a user device and to receive and review user authorization information and transmit an authorization message indicating successful authorization. The mailbox has a mail piece receiving mechanism, a mailbox identifier, a label printer, a locking mechanism, and a microprocessor. The microprocessor is configured to communicate with a user device having received an authorization message, to control the label printer to print a mailing label corresponding to services selected by a user via the user device, to (Continued)

control the locking mechanism in response to communications from the user device to allow the user to place a mail piece in the mail piece receiving mechanism and to lock the mail piece receiving mechanism after the mail piece is placed therein, and to communicate with the remote computing device.

25 Claims, 6 Drawing Sheets

(56) References Cited

U.S. PATENT DOCUMENTS

| | | | | |
|---|---|---|---|---|
| 2011/0307357 | A1* | 12/2011 | Parameswaran | G06Q 10/08 705/30 |
| 2013/0132217 | A1* | 5/2013 | Yahn | G07F 17/26 705/17 |
| 2013/0132367 | A1* | 5/2013 | King | G07F 17/40 707/711 |
| 2013/0328661 | A1* | 12/2013 | Phillips | G06K 9/00771 340/5.7 |
| 2014/0279648 | A1* | 9/2014 | Whitehouse | G06Q 10/083 705/330 |
| 2014/0330407 | A1* | 11/2014 | Corder | G06Q 10/0631 700/90 |
| 2015/0120603 | A1* | 4/2015 | Walker | G06Q 10/0836 705/339 |
| 2015/0127573 | A1* | 5/2015 | Amacker | G06K 9/00624 705/341 |
| 2015/0154555 | A1* | 6/2015 | Skaaksrud | H04W 12/06 705/333 |
| 2015/0178677 | A1* | 6/2015 | Strand | G06Q 10/0836 705/28 |

OTHER PUBLICATIONS

Twon, Andrew and Matt Wilkinson. Toshiba shows "Digital Kiosk" at Embedded World 2014. Jan. 9, 2014. Normans Media Ltd. M2 Presswire Retrieved from http://dialog.proquest.com/professional/docview/1475325486?accountid=161862. (Year: 2014).*

* cited by examiner

SMARTPHONE-CONTROLLED MAILBOX SYSTEM

This application claims the benefit of U.S. Provisional Application No. 61/934,189, filed Jan. 31, 2014, which is hereby incorporated by reference in its entirety.

FIELD OF THE INVENTION

The present invention relates generally to an internet-based, portable computing device-controlled mailbox postage and security system for package and other mail piece drop-off and pick-up.

BACKGROUND

For decades, the mailbox system for mailing letters and packages (collectively, "mail pieces") with the United States Postal Service ("USPS") has been based on pre-paid stamps, authorized postage meter printed stamps, and payment taken and postage applied by USPS personnel at Post Office counters. This system has functioned acceptably for many years. However, it requires that physical proof of postage payment be applied to the mail piece before it enters the USPS processing and delivery system. Traditional postage stamps must be purchased by the customer (hereinafter "sender") from the USPS or a designated retail outlet. The price of mailing changes regularly and it can be difficult for senders to determine the amount of postage required.

To mail large envelopes and packages, senders typically go to a Post Office, wait in line for assistance, have their item measured and weighed, select between different delivery options with the clerk, pay for the correct postage, and finally release their mail piece to the USPS. Many business offices enter contracts with USPS-authorized third parties to obtain their own postage metering devices, also known as franking machines. These third parties can charge high rents for their devices and related services. Senders with postage meters can weigh and classify their own mail pieces, and either stamp on the required postage or print it out and apply it to the mail piece. Postage fees are tracked on their metering device and paid periodically via the senders' accounts with the authorized third party.

A more recent extension of the franking machine approach is a software-based application whereby a home-based sender or small business can print labels and postage without dedicated mailing hardware. Providers include the USPS itself (Click-N-Ship application), as well as other commercial providers such as Stamps.com, Endicia and Pitney Bowes. Payment is made via a billing account with the software provider, or by credit card, bank account debit, PayPal or other third-party payment system. While these software applications are somewhat popular with frequent senders, they still require considerable effort and administration on the part of the sender before an item can be released to the shipper.

Commercial express letter and package carriers, such as UPS and Federal Express (collectively, "shippers") offer counter-based mail piece acceptance, but rely more heavily on pre-arranged accounts with their senders. Occasional senders may also pay for postage by writing or printing credit card information and signature on the label, but the sender must first obtain the label forms of the particular shipper.

Needs exist for improved mail piece induction systems and methods.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

A new mail piece induction system that offers the option for electronic payment of postage fees, and secure drop-off and pick-up of mail pieces at unmanned stations, all using smartphone technology, is of great convenience to senders. The system also meets high post-9/11 security standards for sender identification and provides additional benefits to the shipper from the electronic data about the sender and sender's location at the moment the item is released to the shipper. A smartphone (or other mobile device) provides an operational interface between the user and the mail receptacle and provides a communications link between a web-based server operated by the shipper and the physical mail receptacle that receives the mail piece. Mass-produced hardware, reasonably mature software-based capabilities and public data communications networks enable rapid implementation.

The disclosed system in various embodiments is intended for mail pieces, which by definition include packages, standard-size letters and larger flat mail, though the system may provide the greatest utility when handling packages.

To utilize this smartphone-controlled mailbox system, the user first downloads a software application (APP) from the shipper's website. The user opens an account by inputting identifying personal data and billing information so that any payments due are billed electronically to the user.

To send a mail piece the user may approach a mailbox system (e.g. kiosk) and launch the software application (APP) on his smartphone. This application may open a user screen and establish electronic communications with the mail system using Bluetooth or other short range communication technology. Using the smartphone as an interface device, the user may select the services desired and input personal identification information. This information is sent by the smartphone to a web-based server application operated by the shipper using e.g. conventional longer range cellphone or 3G data communications technology and the internet.

If the user is authorized by the shipper, the web-based server may send a command back to the smartphone that communicates with the mailbox system to unlock it for the user. Lockable features may include the mail piece induction door (or drum), and optionally a packaging supplies cache. The user may have a pre-packed mail piece or may insert an item to be mailed in a piece of packaging obtained from the cache. The mail box system may print an identifying address label with bar code. The user may apply the barcoded label to his mail piece. As a security measure for the shipper and for the user, a photograph of the labeled mail piece may be taken. This may be accomplished by the smartphone's camera or by a camera installed inside the mail piece acceptance receptacle of the mailbox. The user puts the mail piece into the mailbox system, closes the door, and the door may lock. The shipper may require that an in-receptacle photograph be taken only once the receptacle door has been re-locked. This provides assurance to the shipper and the user that the mail piece was indeed given over to the custody of the shipper. The photograph taken by the user and/or by the in-box camera may become part of an electronic receipt provided to the user.

Once the mailing transaction has been completed, the user's smartphone may be used to communicate data from the mailing system to the web-based server. This data may include mail piece image, user identification, user location, information about the mailbox system in general, and/or other electronic data. The web-based server may also communicate back to the smartphone to provide tracking data for the mail piece, advertising and/or other information relevant to the user and his location. Such implementations allow the mail box to be installed in remote locations without the need for an Internet connection, however in some implementations a mail box may have a network/Internet connection allowing it to communicate directly with the remote web server and vice versa, in addition to or instead of via the user's mobile device/smartphone.

When these operations are completed, the communication link between the smartphone and the web-based server application and/or mail box may terminate. All physical and electronic access to the mailbox system by the user may end.

The smartphone controlled mailbox system architecture may also be applied to mail piece delivery systems, in particular, to package delivery systems. To improve customer convenience, several shipping companies including the USPS have offered mailbox systems where users can pick up their packages at any time. These "locker box" mail delivery systems in embodiments benefit from the same smartphone/mobile device interface system as the sending-oriented mailbox systems described herein.

For a locker box application, the user may access a software application on his smartphone and establish short range communications with the "locker box" and long range communications to the shipper's web-based application. The user may enter his PIN code (or other authorization information) and be authorized by the web-based application. Once the user is authorized, the web-based application may transfer information to the smartphone that is relayed to the locker box using short range communications. Data in the communication string from the web-based server to the smartphone to the locker box enable a specific locker to be opened where that user's package has been placed.

Once the mail receiving transaction has been completed, the user's smartphone may communicate data from the locker box to the web-based server. This data may include when the package was picked up, how long the package was in the locker, user identification information, user location, and/or other information about the locker box in general. The web-based server may also communicate back to the smartphone to provide advertising and/or other information relevant to the user and his location. When all of the operations are completed, the smart phone may be disconnected from communications with the locker box system and the web based server application.

Both the mailbox system and the locker box systems may be configured to be run on conventional line power and/or on solar energy using a battery and solar charging system. Data communication between these mailing systems and the shipper's web-based servers may be performed over the user's smartphone link established during the mailing transaction. This architecture allows tremendous flexibility in the location of these mailbox systems, since no fixed electrical or data communications infrastructure is required. The freedom to place these systems anywhere allows them to be deployed in great numbers and increases the convenience to the customers and host sites alike.

In summary, embodiments of the new system allow the sender to purchase postage, drop off and pick up mail pieces without going to a post office or other such manned facility. The system leverages the capabilities of the smartphone to serve as both a user interface to these mailing systems and as a bi-directional communication channel between the web-based server and the mailing system in the field. These features allow mailing systems to be much simpler and much less expensive, since they are essentially a peripheral device to the smartphone, which provides the control logic and the communications to the web-based server. The mailing systems do not require their own internet connections. The mailing systems may be simple devices that use very little power, such that their needs can be easily accommodated without access to grid power, e.g. by solar panels of modest size. The independence from grid power and data connections allows shippers to install this type of mailbox systems and locker box systems in the field easily, inexpensively and in quantity to enhance convenience for their customers. The shippers obtain necessary security information about the identity of the sender and the mail piece, and receive additional benefits from electronic access to the customer at the point of sale in the form of opportunities to offer up-sell services and sell location-sensitive advertising.

A new mailbox system includes a remote computing device configured to communicate with a local external user computing device over a data network and to receive and review user authorization information from the local external user computing device and transmit an authorization message to the local external user device indicating successful authorization, and a mailbox including a mail piece receiving mechanism configured to receive a mail piece therein, a unique mailbox location identifier, a label printer, a locking mechanism configured to prevent or allow access to the mail piece receiving mechanism to deposit a mail piece therein, and a microprocessor configured to communicate with a local external user computing device having received an authorization message from the remote computing device, to control the label printer to print a mailing label corresponding to services selected by a user via the local external user computing device, to control the locking mechanism in response to communications from the local external user computing device to allow the user to place a mail piece in the mail piece receiving mechanism and to lock the mail piece receiving mechanism after the mail piece is placed therein, and to communicate with the remote computing device via the local external user computing device.

The mailbox system may also include non-transitory computer-readable storage medium on the local external user computing device having computer readable instructions stored thereon, wherein the computer readable instructions are configured to carry out operations, including: obtaining the unique mailbox location identifier from the mailbox, connecting with the remote computing device over a network, displaying shipping services on a local external user computing device display and receiving user input shipping service selections, receiving user authorization information and communicating the user authorization information to the remote computing device for review, receiving the authorization message from the remote computing device, establishing a communication link to the microprocessor, responsive to receipt of the authorization message, and transmitting user input shipping service selection information to the microprocessor.

The operations may also include receiving user-input user identifying information, user billing information, and user authorization information and transmitting the user-input user identifying information, user billing information, and user authorization information to the remote computing device.

Obtaining the unique mailbox location identifier from the mailbox may include at least one of scanning a barcode ID label at the mailbox location using the local external user computing device, communicating with the mailbox by NFC, and communicating with the mailbox by Bluetooth, taking an image of a mailbox ID label and using optical character recognition to decode an alphanumeric code/information thereon, manual inputting of an alphanumeric or other code located on the mailbox, and scanning of a QR code or other computer-readable device.

Connecting with the remote computing device over a network may include establishing communications through a cellular or WiFi provider to the Internet.

The remote computing device may be a shipping company web server.

The operations may also include requesting authorization information from the user after user-input shipping service selections are finalized.

The communication link to the microprocessor may be a wireless communication channel.

The label may be a complete, barcoded address label for placement on a mail piece or any other type of label.

The system may also include a shipping supplies cache, where the locking mechanism is further configured to prevent or allow access to the shipping supplies cache. This cache may contain, for example, packaging supplies (boxes, envelopes, tape), writing supplies, etc.

The mailbox may also include a camera configured to take images of mail pieces deposited in the receiving mechanism after the locking mechanism has locked the receiving mechanism to prevent access to the receiving mechanism.

The microprocessor may be configured to control the locking mechanism to prevent access to the mail piece receiving mechanism, responsive to a mail piece being deposited therein. In implementations, existence of a mail piece in the receiving mechanism may be confirmed by imaging, weighing, and the like.

The operations may also include prompting a user to image the mail piece using a camera device on the local external user computing device and receiving an image of the mail piece. For example, the camera function of the local external user computing device may be activated, displaying camera controls on the display, along with a message directing the user to take a picture of the mail piece. After a picture is taken, it may be checked to determine if it is of sufficient quality, for example to read the label or see other identifying features, and/or that it is a picture of a mail piece. This check may involve displaying the captured image to the user and requesting that the user verify the picture is of sufficient quality and/or is of the mail piece, and/or processing the image on the user device to verify its resolution, etc.

The microprocessor may also be configured to communicate information relating to the mailbox to the remote computing device via the local external user computing device, the information comprising at least one of a status of mailbox components, a number of mail items in the mailbox, and adequacy of label printer consumables.

The mailbox may also include sensors configured to collect data and provide information to the remote computing device, wherein the collected data comprises at least one of local weather conditions, chemical, nuclear, or biological agent detection, and log files of passing local external user computing device identifications. Thus the mailbox may detect and indicate local conditions in the area around the mailbox, which may be convenient for weather and/or other monitoring in remote or rural locations, where such mailboxes can easily be used as a platform for such technology. The mailbox may also have sensors directed to the mail piece receiving mechanism, for example an x-ray or shortwave detector for determining contents of mail pieces and/or explosives or other chemical and/or biological detectors for detecting potentially hazardous mail pieces before they are picked up by the shipper.

The remote computing device may also be configured to download mail piece tracking information and/or advertising to the local external user computing device after a mail piece is deposited in the mail piece receiving mechanism.

The microprocessor may be configured to communicate with only a single local external user computing device having received an authorization message from the remote computing device at one time, and to disconnect the communication after a mail piece shipping transaction is completed so that another local external user computing device can connect and the next customer be served.

The system may also include a solar panel for powering the mailbox, without needing an electrical utility connection.

A new mail piece locker box system includes a remote computing device configured to communicate with a local external user computing device over a data network and to receive and review user authorization information from the local external user computing device and transmit an authorization message to the local external user device indicating successful authorization and a mail piece locker box, including one or more mail piece retrieval lockers configured to hold one or more mail pieces therein and to make the one or more mail pieces therein available for retrieval by a user, a locker box identifier, a locking mechanism configured to prevent or allow access to the mail piece retrieval lockers to retrieve mail pieces therein, and a microprocessor configured to communicate with a local external user computing device having received an authorization message from the remote computing device, to control the locking mechanism in response to communications from the local external user computing device to allow the user to retrieve mail pieces from one or more of the mail piece retrieval lockers, and to communicate with the remote computing device via the local external user computing device.

The mail piece locker box system may also include non-transitory computer-readable storage medium on the local external user computing device having computer readable instructions stored thereon, where the computer readable instructions are configured to carry out operations, including: obtaining the locker box identifier from the locker box, connecting with the remote computing device over a network, displaying mail pick-up services on a local external user computing device display and receiving user input mail pick-up service selections, receiving user authorization information and communicating the user authorization information to the remote computing device for review, receiving the authorization message from the remote computing device, establishing a communication link to the microprocessor, responsive to receipt of the authorization message, and transmitting user input mail pick-up service selection information to the microprocessor.

A new mail piece induction method includes obtaining a unique mailbox location identifier from a mailbox, displaying shipping service options on a local external user computing device display and receiving user input shipping service selections, receiving and reviewing user authorization information from the local external user computing device and transmitting an authorization message to the local external user device indicating successful authorization, establishing a communication link between the local external user computing device and a mailbox microprocessor, responsive to receipt of the authorization message, printing a mailing label corresponding to services selected by a user via the local external user computing device, unlocking a mail piece receiving mechanism to allow the user access for placing a mail piece in the mail piece receiving mechanism, and locking the mail piece receiving mechanism to prevent user access after placement of the mail piece in the mail piece receiving mechanism.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein.

DETAILED DESCRIPTION

Figure 1:
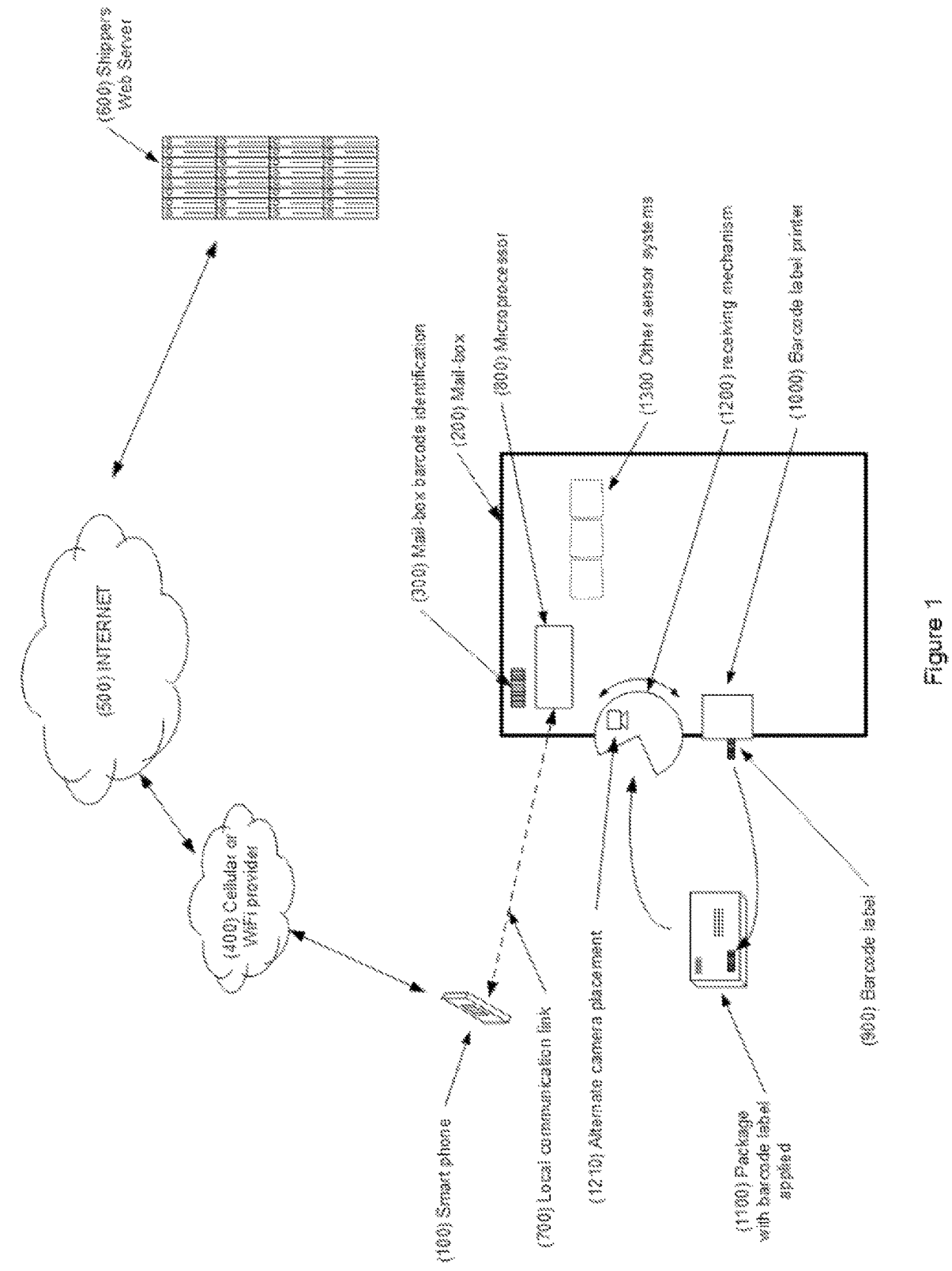
FIG. 1 is a block diagram that illustrates the data communications between the user's smartphone and a mail box system

Two smartphone-controlled mail systems will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may affect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

Embodiments described below include a mailbox, user smart phone, and web server, which communicate with each other over data links (e.g. cell network, WiFi, etc.). In other embodiments, other computing devices may be substituted, for example, a user tablet or portable gaming system may be substituted for the user smart phone, any type of server or computing device serving a similar purpose may be substituted for the shipper web server, etc. The figures do not show all of the internal components of these computing devices, which are not necessary to describe the functioning of the illustrated embodiments, however each computing device may have a CPU or other processing device (e.g. digital or analog processor or circuit for processing information, a plurality of distributed or local processing units, etc.), electronic storage (e.g. integral and/or removable optically or magnetically readable storage media, charge based storage media such as RAM, cloud-based virtual storage resources, etc.), network interfaces for communication with remote devices, etc. The user device (e.g. smart phone) at least also may have a display and user input device(s) for carrying out described functionality, while the web server may include databases for storage of user information etc.

The processing device of each computing device may be configured to execute various functional modules by software; hardware; firmware; some combination of software, hardware, and/or firmware; and/or other mechanisms for configuring processing capabilities on the processors. As used herein, the term "module" may refer to any component or set of components that perform the functionality attributed to the module. This may include one or more physical processors during execution of processor readable instructions, the processor readable instructions, circuitry, hardware, storage media, or any other components. The processor readable instructions may be stored on non-transitory computer readable storage media of the computing devices.

It should be appreciated that although the modules may be described as implemented within a single processing unit and/or computing device, in implementations in which the processors include multiple processing units, one or more of the modules may be implemented remotely from the other modules. The description of the functionality provided by the different modules described below is for illustrative purposes, and is not intended to be limiting, as any of modules may provide more or less functionality than is described. For example, one or more of modules may be eliminated, and some or all of its functionality may be provided by other ones of modules. As another example, a processor may be configured to execute one or more additional modules that may perform some or all of the functionality attributed below to one of the described modules.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 shows a general description of a smartphone-controlled mailbox system in an embodiment, and illustrates the hardware and flow of communications between the user, the system, and the shipper. This figure illustrates the flow of information and the control of the mailbox system device. In the context of this description, the "shipper" can be the USPS, UPS, Federal Express, or any other standard or express mail organization, and the word "mail piece" can mean anything from a single letter to a parcel/package.

In preparation to use the smartphone-controlled mailbox system, the sender first downloads a software application provided by the shipping company to his smart phone (100). This software application requires the sender to provide identifying information and billing information to be used to pay any required transaction fees. The user also sets up a Personal Identification Number (PIN code) or other password protection as is typical with internet-based payment systems.

When accessing a mailbox system (200), the user starts his smartphone software application and then uses his smartphone (100) to scan a barcode ID label (300) that identifies the specific mailbox unit he is accessing. Other electronic methods of identifying the specific mailbox unit are possible. Near Field Communication (NFC), low-power Bluetooth, or other sensing systems may be utilized.

The smartphone establishes communications through the cellular or WiFi provider (400) to the INTERNET (500) and connects to the shipper's web server (600).

The user's smartphone (100) then presents a menu of services for the user to select from. User selections are made on the smartphone (100) and when complete, the software application requests the user to input his PIN number or password to access the mailbox unit. This information is communicated through the cellular or WiFi provider (400) and internet (500) to the shipper's web server (600) where the user account information is reviewed and an authorization message is sent back to the user's smartphone (100). Once authorized, the user's smart phone (100) establishes a local communication link (700) by NFC, Bluetooth or other wireless communication channel to a microprocessor (800) located inside of the mailbox device.

When operating the mailbox system (200) the microprocessor (800) may print out a complete, barcoded address label (900) from a label printer (1000). The user places the label (900) onto his mail piece (1100) and places the mail piece into the receiving mechanism (1200) of the mailbox device. As a security measure and as part of the user's receipt, a photograph of the addressed mail piece is taken. This may be accomplished by the user, as guided and prompted by the software application, to use the camera of his smartphone (100) to take a photo of the labeled mail piece (1100). Alternatively, the photograph may be taken by a camera (1210) installed inside the receiving mechanism (1200). The photograph may be taken after the mail piece has been entered into the receiving mechanism and the receiving mechanism has been re-locked, in which case the photograph serves as proof-positive to the shipper and the user that the mail piece has been received by the shipper. Once security requirements have been met, the receiving mechanism (1200) is unlocked and the user can place the mail piece (1100) into the mailbox system (200). The receiving mechanism (1200) autonomously re-locks after the mail piece (1100) has been received. Any auxiliary features of the mailbox device, such as a small shipping supplies cache for user convenience, may also re-lock.

After the transaction has been completed, the shipper's web-based server (600) may download mail piece tracking information and other information or advertising to the user's smartphone (100) using the INTERNET (500) and the cellular or WiFi communications (400) links. In a similar fashion, the mailbox system microprocessor (800) controller may send additional information back to the shipper's web-based server using the local communications link (700) with the smartphone (100) and the cellular or WiFi communication (400) link and the INTERNET (500). This information may contain information about the mailbox system (200) including the status of components, number of mail items in the mailbox, adequacy of labeler consumables, etc. Other sensors or systems (1300) may also be located in the mailbox (200) as a convenient platform to collect other data and utilize the same communications links to provide valuable information back to the shipper's web-based server. These systems and data may include other information such as the local weather conditions, chemical, nuclear, or biological agent detection, and/or log files of passing smartphone ID's.

Once all of the data transactions have been completed, the smartphone (100) disconnects the local communications link (700) with the mailbox (200), and the system is available for access by the next user.

Figure 2:
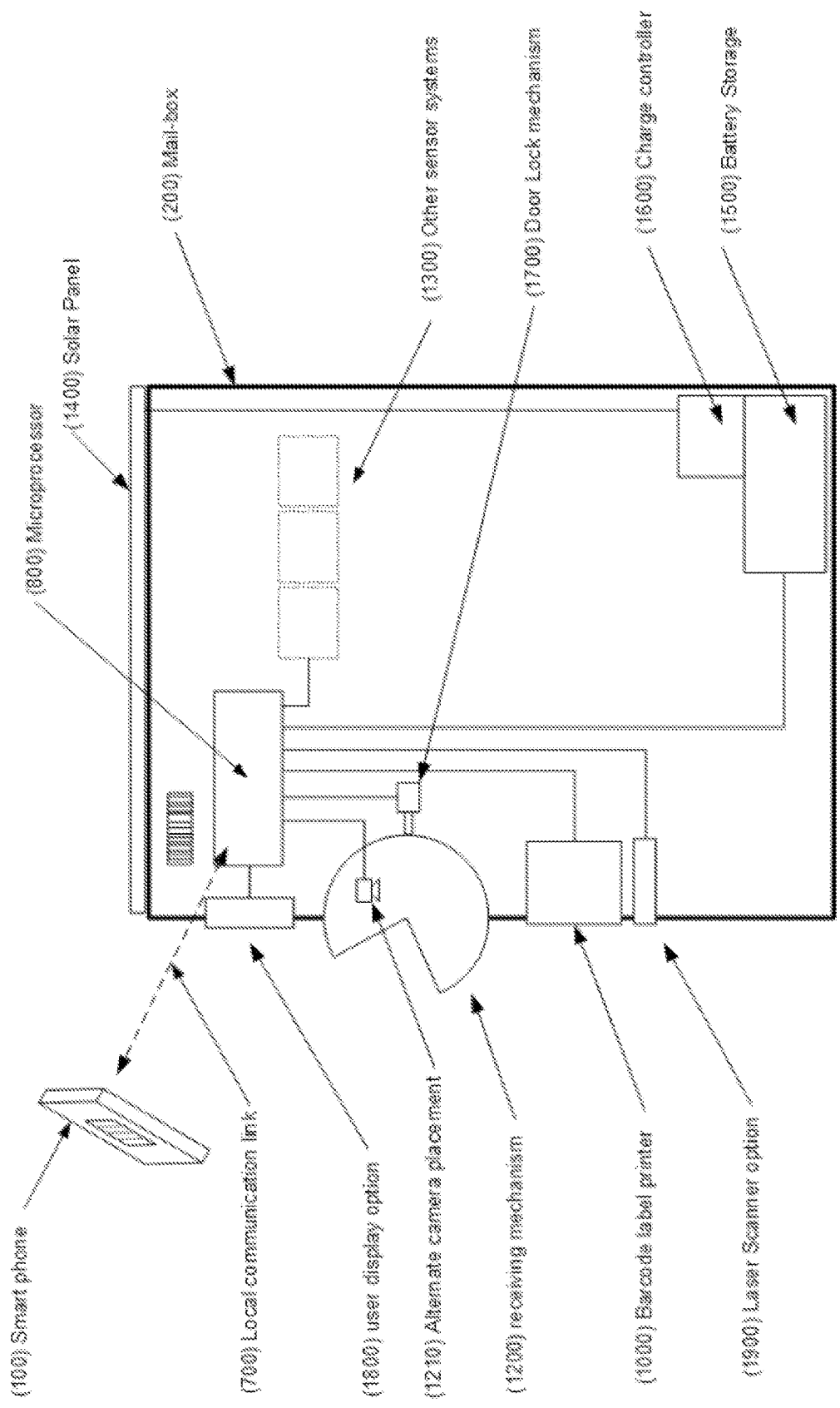
FIG. 2 is a block diagram of a mail box system

FIG. 2 shows a block diagram of the mailbox system, in an embodiment. The mailbox (200) is an enclosed structure that provides physical security for the contents and can withstand outdoor weather conditions. A mail piece receiving mechanism (1200) is incorporated in the device to allow a user to input a package, yet prevent access to previously inducted packages. To facilitate the installation of these mailbox systems, a solar panel (1400) may be utilized for appropriate locations, i.e. those receiving some direct or strong indirect sunlight, and charge an on-board battery (1500) with a conventional solar charge controller (1600). Power from the battery is supplied to the microprocessor (800) and other on-board devices including the door lock (1700), the barcode label printer (1000), and optional other items such as a camera (1210) in the receiving mechanism, and a user display (1800), a laser scanner (1900), and other sensor systems (1300) if used.

The microprocessor (800) establishes a local communication link (700) with the user's smartphone (100) and provides the data communications and control logic to enable the operation of the mailbox system (200).

Figure 3:
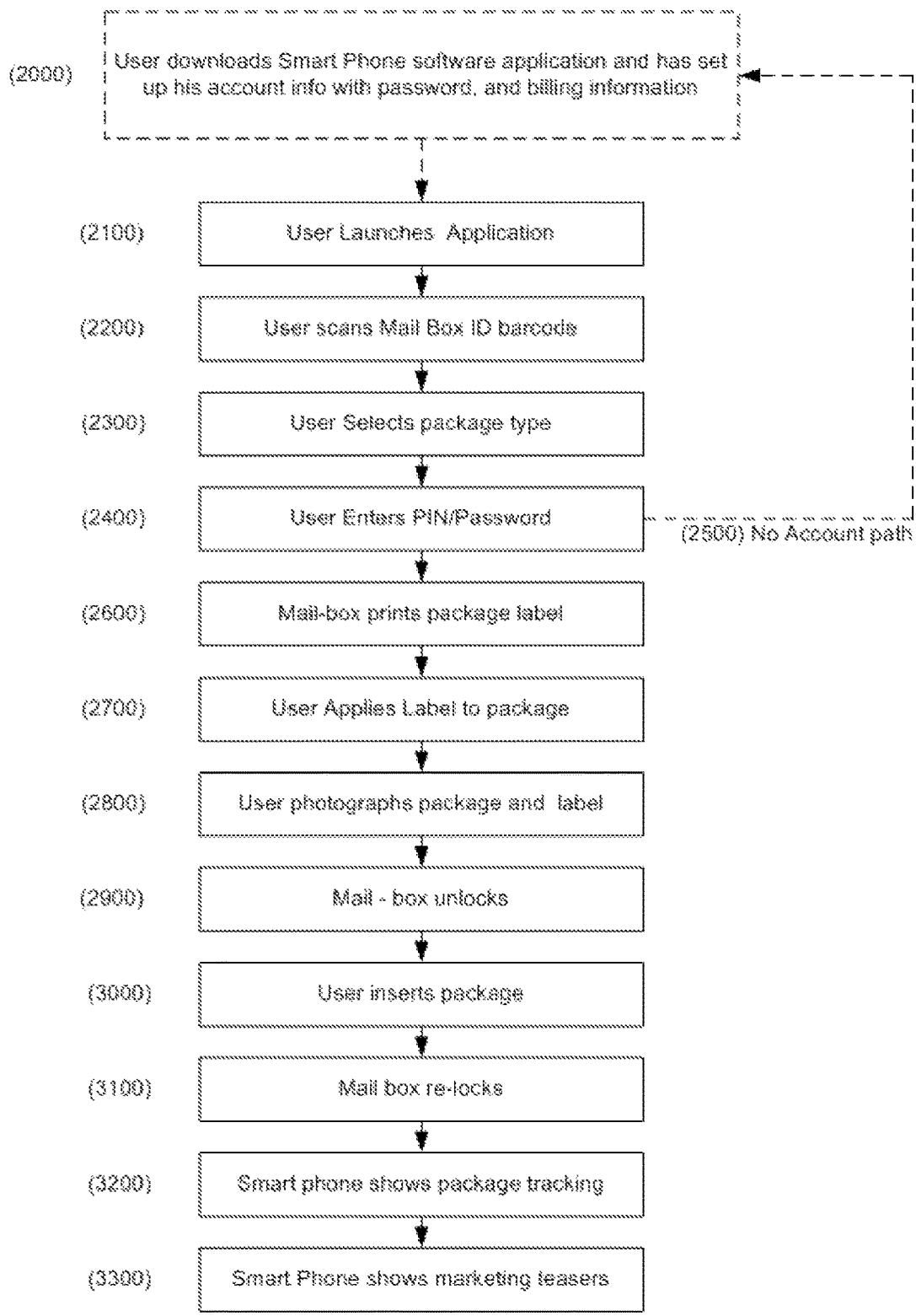
FIG. 3 is a block diagram of the smartphone logic for controlling a mail box system

FIG. 3 presents a block diagram flowchart of the user interface for the mailbox system operation, in an embodiment. Initially the user downloads the software application (2000) to his smartphone to be able to utilize the mailbox system. This software application ("APP") is downloaded to the cellphone using conventional techniques that are widely used in practice. Payment account information is required to establish a means to bill the customer for services rendered that incur a charge from the shipper. These services may include standard shipping fees, upgraded service options and/or a host of specific offerings from the shipper. The user's smartphone application has the ability to accept charges, so the application may require password protection, personal identification number (PIN) and/or other user identification methods to protect any subsequent transactions from unauthorized use. User registration may be carried out via a user registration module running on the user's smartphone and/or the shipper's web server. The software application (2000) is provided by the shipper so future upgrades may be made available to users for downloading as services are added or modified.

When the user approaches the mailbox, he launches the application (2100) on his smartphone. The application provides a series of screens and user prompts to help the user navigate through the shipping transaction process.

The first action requested of the user is to identify the specific mailbox. This may be accomplished by scanning the mailbox identification barcode (2200) via the scanning capabilities of virtually every smartphone. Other electronic means of identifying the mailbox may exist, enabled by Near Field Communication, low-power Bluetooth, and/or "handshake" technologies coming into use. This information may be used to determine the location of this transaction and to make sure that only one user is accessing the mailbox at a time. The location information of the transaction may be sent to the shipper's web-based server and used to keep track of mail packages being dropped off at a specific location. This information may also be used for a variety of security-oriented cross-checks. For example, the smartphone's location data may be used to verify that the user's smartphone is really at the mailbox device location. A mailbox ID module running on the user's smartphone may be configured to obtain the mailbox ID as described, with or without interaction with the user.

The user has an opportunity to select from a variety of mail piece types (2300) for billing purposes. As an example, a package with a pre-paid shipping label may be processed directly without initiating billing for shipment. Pre-paid packages may still be processed by asking the user to input his PIN/Password (2400); thus providing the shipper the security of knowing that this is a "known user" with identification, account information on file and good standing status. A shipping service module running on the user's smartphone may be configured to present shipping options to the user and receive shipping selections and forward them to the web server and/or mail box. An authentication module on the smartphone and/or web server may be configured to verify the user authorization. If the user does not have an account or is not in good standing, he may be denied access and may be re-directed (2500) to the user download page (2000).

If the user is accepted by the system, the mailbox may print a shipping label (2600) that contains address information and uniquely identifies the mail piece being shipped. A label module running on the mail box may be configured to carry out the label printing operation. The application may prompt the user to apply the shipping label to the mail piece, for example by the shipping service module. This shipping label is machine-readable and identifies the mail piece to the shipper's IT system. The shipper's system may then identify the mail piece by conventional machine readers and associate it with the user, the shipping services selected and the shipping destination. A shipper system coordination module may be configured to associate such user account-related information with the mail piece in the shipper's mail tracking system. This information greatly facilitates mail piece processing and also identifies the mail piece to generate tracking reports that may be sent electronically to the user. The printed shipping label may also incorporate a receipt feature to provide evidence of the mail piece being shipped. This receipt may be the backing of the printed barcode label, or a second printed barcode label, or an otherwise separable portion of the label printed.

As an added security measure, the system may request the user to photograph the mail piece with the printed label (2800) with his smartphone. This image may be sent to the shipper's web-based server and used to further validate the package when received at the processing facility. A mail piece imaging module running on the smartphone and/or mail box may be configured to take the pail piece images, with or without user interaction. Once the data has been collected, the mail box physically unlocks (2900) and the user inserts his package (3000) into the mail receptacle. The mail box automatically re-locks (3100), and the transaction is complete. A receptacle locking module running on the mail box may be configured to control the locking and unlocking of the mail piece receptacle. The user may have the option to mail another package or can indicate on the application that he is done.

The mail piece photograph may also be taken by a camera installed inside the mail piece receiving mechanism, once the mechanism has been relocked. This provides further proof of the mail piece being received by the shipper. The image may be transmitted via the wireless connection between the mailbox and the smartphone to the shipper, and to user as part of his transaction receipt, for example by the mail piece imaging module.

If the user is done, the smartphone application may begin showing mail piece tracking information (3200) provided by the web-based shipper's server, which may also deliver marketing messages (3300). A post-mailing communications module running on one or more of the mail box, smartphone and web server may be configured to transmit such post-transaction information.

Figure 4:
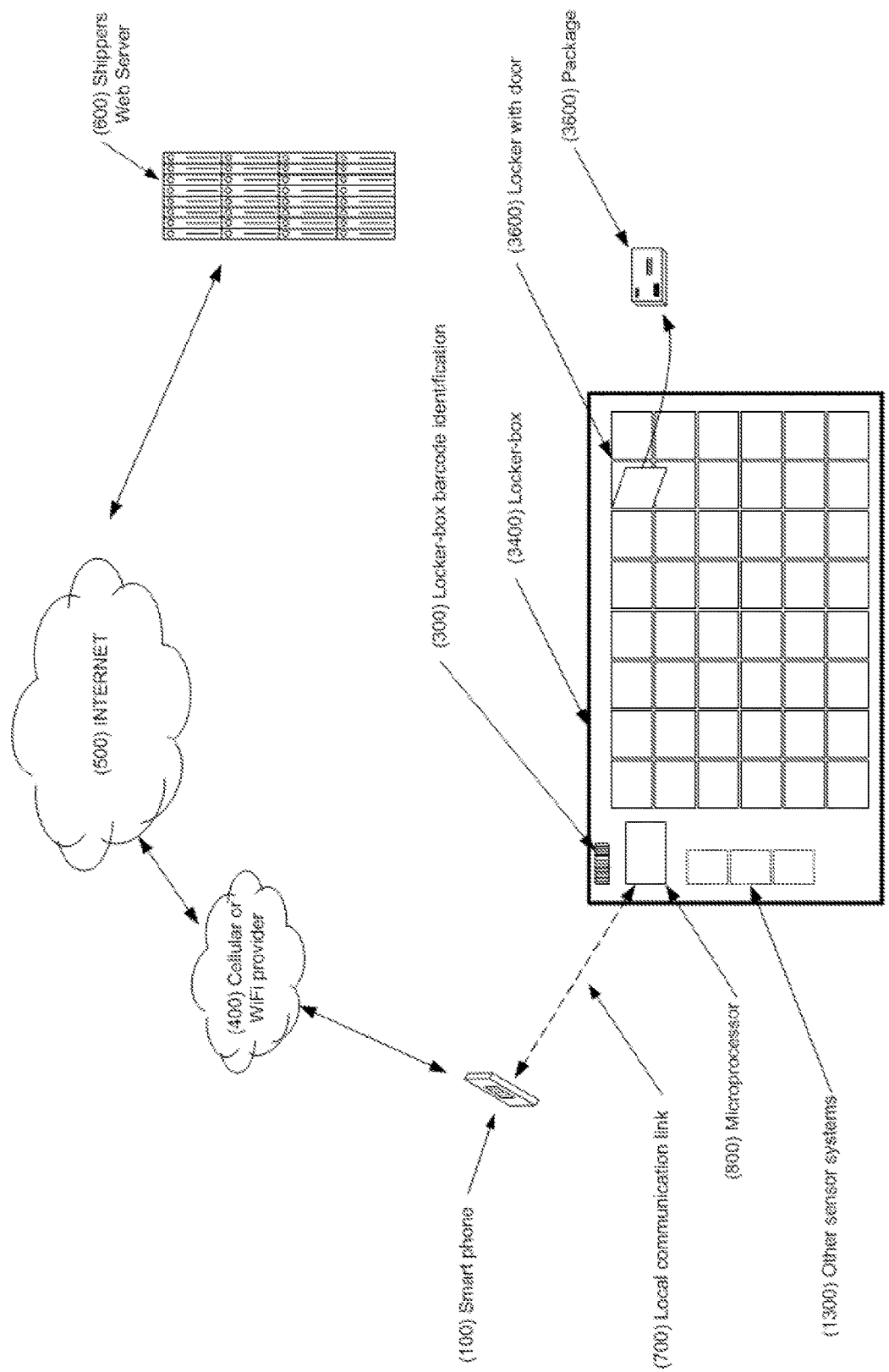
FIG. 4 is a block diagram that illustrates the data communications between the user's smartphone and a locker box system

FIG. 4 shows a general description of a smartphone-controlled locker box system, in an embodiment, and illustrates the hardware and flow of communications between the user, the locker box system, and the shipper. This figure illustrates the flow of information and the control of the locker box system device. In the context of this description, the "shipper" can be the USPS, UPS, Federal Express, or any other standard or express mail organization, and the word "mail piece" can mean anything from a single letter to a parcel.

In preparation to use the smartphone-controlled locker box system, the sender first downloads a software application provided by the shipping company to his smart phone (100). This software application requires the sender to provide identifying information and billing information to be used to pay transaction fees, if any. The user also sets up a Personal Identification Number (PIN code) or other password protections, as is typical with internet-based purchasing and access control systems.

When accessing a locker box mail piece pick-up system (3400), the user starts his smartphone software application and then uses his smartphone (100) to scan the locker box barcode identification (300) that identifies the specific locker box system he is accessing.

The smartphone establishes communications through the cellular or WiFi provider (400) to the INTERNET (500) and connects to the shipper's web server (600).

The user's smartphone (100) may then present a menu of pick-up oriented services for the user to select from. When choices are complete, the software application may request the user to input his PIN number or password to access the system. This information may be communicated through the cellular or WiFi provider (400) and internet (500) to the shipper's web server (600) where the user account information is reviewed. If the user is authorized, the shipper's web server may query the shipper's database to determine locker in which the user's mail piece is stored. An authorization message may be sent back to the user's smartphone (100), which may establish a local communication link (700) to a microprocessor (800) inside the locker box system device. The microprocessor (900) then unlocks the specific locker door (3500) behind which the user's mail piece is located. The locker door may be re-locked automatically after the package (3600) has been removed.

Once the transaction has been completed, the shipper's web-based server (600) may download other information or advertising to the user's smartphone (100) using the INTERNET (500) and the cellular or WiFi communications (400) links. In a similar fashion, the locker box microprocessor (800) may send information valuable to the shipper back to the shipper's web-based server using the local communications link (700) via the smartphone (100), cellular or WiFi communication (400) link, and the INTERNET (500). This information may contain information about the locker box system (300), including the status of components and the time when the locker was filled and the time when the locker was accessed. Other sensors systems (1300) may also be located in the locker box (3400) as a convenient platform to collect other data and utilize the same communication links to provide information back to the shipper's web-based server. These systems and data may include other information such as the local weather conditions, chemical, nuclear, or biological agent detection, or log files of passing smart phone ID's.

Once all data transactions have been completed, the smart phone (100) may disconnect the local communications link (700) with the locker box (3400), and the system is available for access by the next user.

Figure 5:
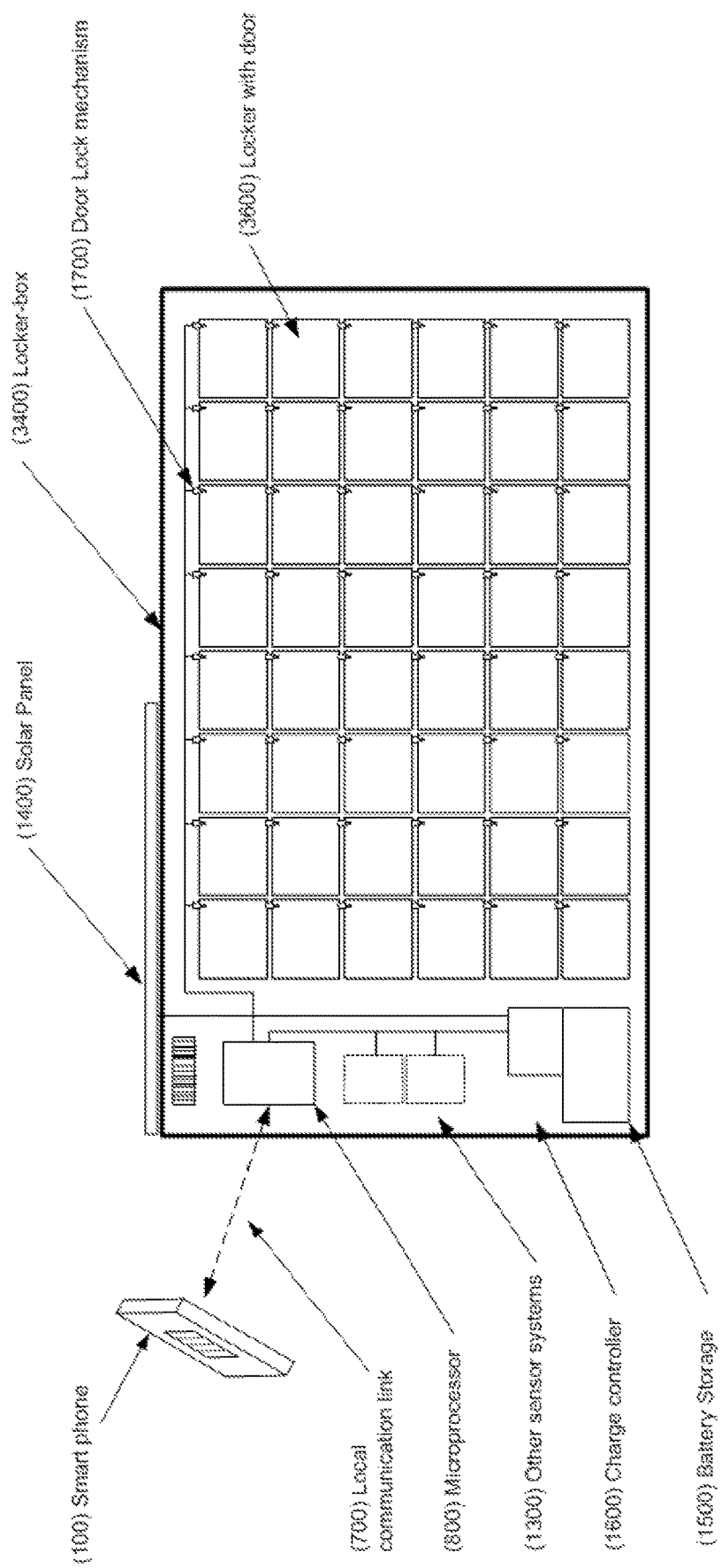
FIG. 5 is a block diagram of a locker box system

FIG. 5 shows a block diagram of the locker box system, in an embodiment. The locker box (3400) is an enclosed structure that provides physical security for the contents and can withstand outdoor weather conditions. A quantity of individual package lockers (3500) is incorporated in the device to allow a user to retrieve a mail piece from a specific locker, yet prevent any access to the contents of any other locker. To facilitate the installation of such locker box systems, a solar panel (1400) is utilized for appropriate locations. The solar panel charges an on-board battery storage (1500) system with a conventional solar charge controller (1600). Power from the battery is supplied to the microprocessor (800) and other on-board devices, including the door lock mechanisms (1700) and optional sensor systems (1300), if used.

The microprocessor (800) establishes a local communication link (700) with the user's smartphone (100) and provides the data communications and control logic to enable the operation of the locker box system (3400).

Figure 6:
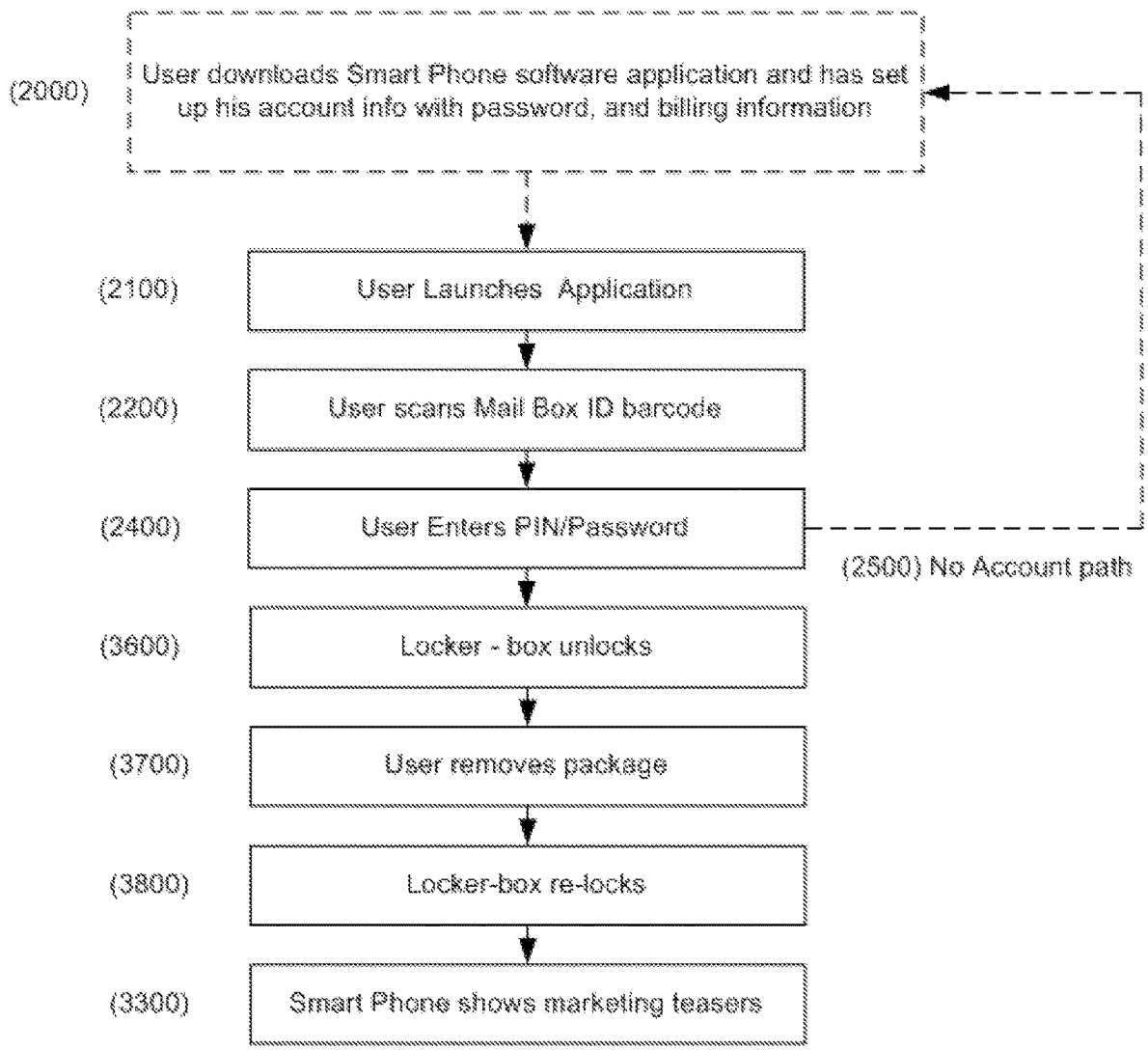
FIG. 6 is a block diagram of the smartphone logic for controlling a locker box system

FIG. 6 presents a block diagram flowchart of a user interface for the locker box system operation, in an embodiment. Initially the user downloads the software application (2000) to his smartphone to be able to utilize the locker box system. This software application (APP) is downloaded to the smartphone using conventional techniques that are widely used in practice. Payment account information is required to establish a means to bill the customer for any services that incur a cost from the shipper. The user's smartphone application has the ability to access the locker box to retrieve mail pieces, so password protection, personal identification number (PIN) or another user identification device is required to protect access to lockers from unauthorized users. The software application (2000) is provided by the shipper, so future upgrades can be made available to the users for downloading, as services are added or modified.

When the user approaches the locker box he launches the application (2100) on his smartphone. The application provides a series of screens and user prompts to help the user navigate through the pick-up process.

The first action requested of the user is to scan the locker box identification barcode (2200). Similar to the drop-off mailbox case, other electronic means may be used to accomplish locker box identification. This information is used to determine the location of this transaction and to make sure that only one user is accessing the locker box at a time. The location information of the transaction is sent to the shipper's web-based server and used to keep track of packages being picked up at a specific location. This information may also be used for a variety of security cross-checks. For example, the smart phones location data may be used to verify that the user's smartphone is really at the locker box device location.

The user is required to input his PIN/Password (2400); this is validated by the shipper to permit access to the locker box. If the user does not have an account or is not of good standing, or he is at the wrong location, he is denied access and re-directed (2500) to the user download page (2000) or elsewhere by the shipper's web application. If the user is an authorized user and has a mail piece stored in the locker box for pickup, the user is notified of the mail piece location on the smartphone display and the locker door for that location is unlocked for access by the user.

Once the user has removed his mail piece (3700), the specific locker box location re-locks (3800) and the smartphone application begins to deliver marketing messages (3300) or other information to the user's smartphone.

The invention is not limited to the particular embodiments illustrated in the drawings and described above in detail. Those skilled in the art will recognize that other arrangements could be devised, for example, using various network architectures, types of software applications, etc. In some embodiments, a mail box may be configured to work with and connect to the systems of various shippers. For example the user-installed application may give users the option of their desired shipper, and even provide comparative pricing prior to the selection, and then connect to a web server for the selected shipper to carry out the remaining operations. The invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the invention has been described with reference to specific illustrative embodiments, modifications and variations of the invention may be constructed without departing from the spirit and scope of the invention.

What is claimed is:

1. A mailbox system, comprising:
 a remote computing device configured to communicate with a local external user computing device over a communication link with a data network and to receive and review user authorization information from the local external user computing device and transmit an authorization message to the local external user device indicating successful authorization;

the local external user computing device having a local communication link with a mailbox using a near field (NFC), Bluetooth®, or other short range communication technology;

the mailbox, comprising:
- a mail piece receiving mechanism configured to receive a mail piece therein;
- a unique mailbox location identifier;
- a label printer;
- a locking mechanism configured to prevent or allow access to the mail piece receiving mechanism to deposit a mail piece therein; and
- a microprocessor configured to communicate with the local external user computing device having received an authorization message from the remote computing device, to control the label printer to print a mailing label corresponding to mailing services selected by a user via the local external user computing device comprising at least standard shipping and upgraded service options, to control the locking mechanism in response to communications from the local external user computing device to allow the user to place a mail piece in the mail piece receiving mechanism and to lock the mail piece receiving mechanism after the mail piece is placed therein, and to communicate with the remote computing device, such communication with the remote computing device comprising transmitting information to the remote computing device, via the local communication link to the local external user computing device and through the local external user computing device's communication link with the data network, and to receive one or more commands from the remote computing device via the local external user computing device and through the local external user computing device's local communication link.

2. The mailbox system of claim 1, further comprising a non-transitory computer readable storage medium on the local external user computing device having computer readable instructions stored thereon, wherein the computer readable instructions are configured to carry out operations, comprising:
- obtaining the unique mailbox location identifier from the mailbox;
- connecting with the remote computing device over the data network;
- displaying shipping services on a local external user computing device display and receiving user input shipping service selections;
- receiving user authorization information and communicating the user authorization information to the remote computing device for review;
- receiving the authorization message from the remote computing device;
- establishing the local communication link to the microprocessor, responsive to receipt of the authorization message; and
- transmitting user input shipping service selection information to the microprocessor.

3. The system of claim 2, wherein the operations further comprise receiving user-input user identifying information, user billing information, and user authorization information and transmitting the user-input user identifying information, user billing information, and user authorization information to the remote computing device.

4. The system of claim 2, wherein obtaining the unique mailbox location identifier from the mailbox comprises at least one of scanning a barcode ID label at the mailbox location using the local external user computing device, communicating with the mailbox by NFC, and communicating with the mailbox by Bluetooth.

5. The system of claim 2, wherein connecting with the remote computing device over the communication link with the data network comprises establishing communications through a cellular or WiFi provider to the Internet.

6. The system of claim 1, wherein the remote computing device is a shipping company web server.

7. The system of claim 2, wherein the operations further comprise requesting authorization information from the user after user-input shipping service selections are finalized.

8. The system of claim 2, wherein the local communication link to the microprocessor is a wireless communication channel.

9. The system of claim 1, wherein the label is a complete, barcoded address label for placement on a mail piece.

10. The system of claim 1, further comprising a shipping supplies cache, wherein the locking mechanism is further configured to prevent or allow access to the shipping supplies cache.

11. The system of claim 1, wherein the mailbox further comprises a camera configured to take images of mail pieces deposited in the receiving mechanism after the locking mechanism has locked the receiving mechanism to prevent access to the receiving mechanism.

12. The system of claim 1, wherein the microprocessor is configured to control the locking mechanism to prevent access to the mail piece receiving mechanism, responsive to a mail piece being deposited therein.

13. The system of claim 2, wherein the operations further comprise prompting a user to image the mail piece using a camera device on the local external user computing device and receiving an image of the mail piece.

14. The system of claim 1, wherein the microprocessor is further configured to communicate information relating to the mailbox to the remote computing device via the local external user computing device and its communication link with the data network, the information comprising at least one of a status of mailbox components, a number of mail items in the mailbox, and adequacy of label printer consumables.

15. The system of claim 1, wherein the mailbox further comprises sensors configured to collect data and provide information to the remote computing device, wherein the collected data comprises at least one of local weather conditions, chemical, nuclear, or biological agent detection, and log files of passing local external user computing device identifications.

16. The system of claim 1, wherein the remote computing device is further configured to download mail piece tracking information and/or advertising to the local external user computing device after a mail piece is deposited in the mail piece receiving mechanism.

17. The system of claim 1, wherein the microprocessor is configured to communicate with only a single local external user computing device having received an authorization message from the remote computing device at one time, and to disconnect the communication after a mail piece shipping transaction is completed.

18. The system of claim 1, further comprising a solar panel for powering the mailbox, without needing an electrical utility connection.

19. A mail piece induction method, comprising:
- obtaining a unique mailbox location identifier from a mailbox, said mailbox comprising a mail piece receiving mechanism configured to receive a mail piece therein, a unique mailbox location identifier, a label printer, a locking mechanism configured to prevent or allow access to the mail piece receiving mechanism to deposit a mail piece therein, and a microprocessor;

displaying shipping services on a local external user computing device display and receiving user input shipping service selections;

receiving and reviewing user authorization information over a communication link to a data network from the local external user computing device and transmitting an authorization message to the local external user device indicating successful authorization;

establishing a local communication link comprising a near field (NFC), Bluetooth®, or other short range communication technology between the local external user computing device and the mailbox microprocessor, responsive to receipt of the authorization message;

controlling the label printer via the microprocessor and thereby printing a mailing label corresponding to services selected by a user via the local external user computing device;

controlling the locking mechanism via the microprocessor and thereby unlocking the locking mechanism to allow access to the mail piece receiving mechanism for placing a mail piece in the mail piece receiving mechanism;

controlling the locking mechanism via the microprocessor and thereby locking the locking mechanism to prevent user access to the mail piece receiving mechanism after placement of the mail piece in the mail piece receiving mechanism;

transmitting information from the mailbox microprocessor via the local external user computing device, over the local external user computing device's communication link to the data network, to the remote computing device; and receiving one or more commands from the remote computing device via the local external user computing device and through the local communication link.

20. The system of claim 1, wherein the mailbox further comprises sensors configured to collect data and provide information to the remote computing device, wherein the collected data comprises log files of passing local external user computing device identifications and at least one of local weather conditions and chemical, nuclear, or biological agent detection.

21. The system of claim 1, wherein the mailbox further comprises one or more sensors configured to determine contents of the mail piece in order to detect whether hazards exist in the contents.

22. The system of claim 1, wherein the mailbox system does not have Internet connectivity.

23. The system of claim 1, wherein the microprocessor only communicates with the remote computing device through the local external user computing device.

24. The method of claim 19, wherein the microprocessor is configured to only communicate with the local external user computing device, and no other local external user computing devices, while the local communication link is active.

25. The method of claim 19, wherein the displaying step further comprises:

showing one or more prompts on the local external user computing device display in response to a user utilizing the local external user computing device to initiate electronic contact with the mailbox.

\* \* \* \* \*